US010085413B2

United States Patent
Frigo, III et al.

(10) Patent No.: US 10,085,413 B2
(45) Date of Patent: Oct. 2, 2018

(54) ANIMAL HABITAT CAGE WITH WASTE DISPOSAL FLOORING

(71) Applicants: Arthur P. Frigo, III, Jupiter, FL (US); Anthony A. Frigo, Jupiter, FL (US)

(72) Inventors: Arthur P. Frigo, III, Jupiter, FL (US); Anthony A. Frigo, Jupiter, FL (US)

( * ) Notice: Subject to any disclaimer, the term of this patent is extended or adjusted under 35 U.S.C. 154(b) by 0 days.

(21) Appl. No.: 14/850,372

(22) Filed: Sep. 10, 2015

(65) Prior Publication Data

US 2016/0066533 A1    Mar. 10, 2016

Related U.S. Application Data

(60) Provisional application No. 62/048,654, filed on Sep. 10, 2014.

(51) Int. Cl.
*A01K 1/01* (2006.01)
*A01K 1/03* (2006.01)

(52) U.S. Cl.
CPC .............. *A01K 1/01* (2013.01); *A01K 1/0103* (2013.01); *A01K 1/03* (2013.01)

(58) Field of Classification Search
CPC .......... A01K 1/01; A01K 1/011; A01K 1/031; A01K 1/0132; A01K 1/0128; A01K 31/04
See application file for complete search history.

(56) References Cited

U.S. PATENT DOCUMENTS

| | | | | |
|---|---|---|---|---|
| 1,094,423 A | * | 4/1914 | Brandt | A01K 31/06 119/469 |
| 2,028,612 A | * | 1/1936 | Kosvich | A01K 31/06 119/469 |
| 2,045,472 A | * | 6/1936 | Kearney | A01K 31/06 119/469 |
| 2,065,923 A | * | 12/1936 | Jessen | A01K 31/04 119/471 |
| 2,738,763 A | * | 3/1956 | Bowes | A01K 31/04 119/463 |
| 4,027,625 A | * | 6/1977 | Wheeler | A01K 1/011 119/170 |
| 4,498,422 A | | 2/1985 | Sou | |
| 4,572,107 A | * | 2/1986 | Clarizo | A01K 31/04 119/463 |
| 5,156,640 A | | 10/1992 | Del Rosario | |
| 5,431,129 A | | 7/1995 | Clark | |
| 5,996,536 A | * | 12/1999 | King | A01K 31/06 119/459 |

(Continued)

*Primary Examiner* — Kristen C Hayes
(74) *Attorney, Agent, or Firm* — McHale & Slavin, P.A.

(57) ABSTRACT

An improved animal habitat cage with waste disposal flooring. A cage body is formed from a top wall and four side walls removably suspended by legs attached to each sidewall. In a first embodiment, a pullout movable bottom that defines a floor on the cage body is used in conjunction with a plurality of scraping elements. The scraping elements may be placed along a cross-member attached between opposing front legs and are constructed and arranged to maintain contact with a top surface of the movable bottom. The bottom is pulled out from the cage body and the scraping elements push waste matter towards the edge of the tray and into the container. An alternative embodiment employs a hinged floor for waste disposal wherein waste matter is directed to a container.

8 Claims, 5 Drawing Sheets

(56) References Cited

U.S. PATENT DOCUMENTS

| | | | |
|---|---|---|---|
| 6,269,775 B1 * | 8/2001 | Watts | A01K 31/06 119/467 |
| 6,571,738 B2 | 6/2003 | Rivard | |
| 7,827,939 B2 * | 11/2010 | Yang | A01K 31/06 119/461 |
| 2007/0012257 A1 | 1/2007 | Siegal et al. | |
| 2009/0274397 A1 * | 11/2009 | Wong | A01K 31/04 383/33 |

* cited by examiner

ANIMAL HABITAT CAGE WITH WASTE DISPOSAL FLOORING

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 62/048,654, entitled IMPROVED ANIMAL HABITAT CAGE WITH WASTE DISPOSAL FLOORING, filed Sep. 10, 2014, the contents of which are incorporated herein by reference.

FIELD OF THE INVENTION

The invention relates to a caging device, and more particularly to an animal habitat rearing cage having a waste disposal system.

BACKGROUND OF THE INVENTION

Small pet owners and laboratory operators appreciate the need for a clean cage used for housing guinea pigs, hamsters, mice and so forth. Such animals spend the majority of their life in the cage so it is imperative that the cage is kept clean if the animal is to maintain a healthy life. For purposes of simplicity, the remainder of this application will focus on the domesticated guinea pig as the animal of interest but it is noted that the improved cage design can be used with any caged animal including birds.

While humans are aware of need for cleanliness, animals are also known to be particular about the cleanliness and organization of their surroundings. To keep the area orderly, they will spend hours moving objects, piling bedding, building nests and, in some cases, stockpiling food. Since the quarters in which animals live are often small, these chores are essential to the animal's overall health and well-being. Unfortunately they do not have control over waste disposal and the pet cannot control the distancing of waste products from their food cache. Waste can quickly accumulate resulting in dangerously unsanitary conditions. Thus, keeping a cage clean is the simplest way to ensure the health and longevity of the animal.

The cage used for housing a guinea pig must be spacious enough to allow for activity areas and be fully ventilated. For example, a conventional cage features a hexahedral shape defined by a top wall, four side walls, and a bottom. Cages side walls are typically made of galvanized steel, stainless steel, or a combination thereof capable of withstanding pet chewing yet providing flow through ventilation. Cage floors are typically a planar sheet of material that can be removed for cleaning. The floor is covered lined with bedding such as wood chips, sawdust, wood shavings or pulp chips. This bedding helps keep waste from spreading, eliminates odors, and provides a comfortable support for the small animals. There are various hexahedral cage bodies known in the prior art, most of which include a bottom wall constructed of wire mesh or smooth panel. A wire net floor permits waste excreted by animals in the cage to fall onto a disposal tray positioned under the wired net bottom wall. While a wired net bottom distances the animal form the waste, the feet of the animal against wire mesh often results in arthritis, corns or even tumors in the soles. Moreover, muck sticks in those places where the wires overlap or are attached. Muck stuck to the wires makes the rearing cage unsanitary requiring troublesome cleansing, efforts such as immersing the wire net bottom in water for a whole day and night and brushing the wire net bottom in hot water to remove the muck from the mesh.

In a basic commercial embodiment, a smooth floor panel accumulates waste on the smooth planer panel bottom. In order to alleviate this unsanitary condition, the smooth panel bottom wall is of a tray type that sits on top of the wire mesh floor, thereby allowing the owner to remove the tray upon which the excrement has accumulated. The owner would then have to manually dispose of the waste atop the tray, clean the top surface of the tray, and then insert the drawer back into the cage body. In another commercial embodiment, a cage may have a wire top that clips onto a bottom tray. Cleaning of this type of cage requires the removal of the top and cleaning of the bottom tray. Both of these cage designs require the pet owner to remove either the cage top or the cage bottom. Although this method is a healthy alternative for the pet, it also entails cumbersome work by the owner to maintain cage cleanliness.

What is lacking in the art is an animal habitat having a movable bottom that, when pulled out, instantaneously removes and cleans excrement from the top surface of the tray, depositing it into an attached waste container.

SUMMARY OF THE INVENTION

An improved cage having a waste disposal system for animals. The cage includes a body, two pairs of legs, a pullout movable bottom, a plurality of scraping elements, and a temporarily positioned waste disposal container. The cage body is comprised of a top wall and four side walls. The cage body is removably attached to the two pairs of legs along the bottom edge of each side wall. The top end of the two pairs of the legs defines a cavity for holding and maintaining the movable bottom. The movable bottom is insertable into the cavity and provides a bottom for the cage body. The movable bottom along with the cage body defines a space in which the small animal can live. A plurality of scraping elements can be constructed and arranged to maintain contact with a top surface of the movable bottom, they extend horizontally downward along a cross-member supported by the front pair of legs and positioned above the cavity. The disposal container for receiving waste is suspended from the legs. As the movable bottom is pulled out from the cage body the scraping elements push waste matter towards the edge of the movable bottom and into the container as the movable bottom is completely withdrawn from the cavity.

Accordingly, it is an objective of the instant invention to provide an animal rearing cage with a self contained waste disposal system that is simple to use, inexpensive to manufacture, and efficient in discarding pet waste promoting cleanliness and eliminating odor.

It is a further objective of the instant invention to provide an animal rearing cage with a waste disposal system that includes a pullout movable bottom that can easily be cleaned by use of a scrapper or gravity. Bedding can be spread on the movable bottom and easily replaced following waste disposal.

Still another objective of the instant invention is to disclose an animal cage that takes minimal time and effort to clean, whereby it is expected that the cage will be kept cleaner as compared to conventional cages in light of the minimal effort required.

It is yet another objective of the instant invention to provide an animal rearing cage having a waste disposal system that includes a disposable waste container, namely a flexible bag, for receiving waste material. Waste material can be deposited into the bag for ease of disposal.

It is a still further objective of the instant invention to provide an animal rearing cage having a waste disposal system that employs at least one scraping element to ensure that waste material deposited on the movable bottom is deflected into the waste disposal container.

It is still yet further an objective of the instant invention to provide an animal rearing cage having a waste disposal system whereby part of the movable bottom may be tilted to direct the waste material into an awaiting disposable receptacle.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
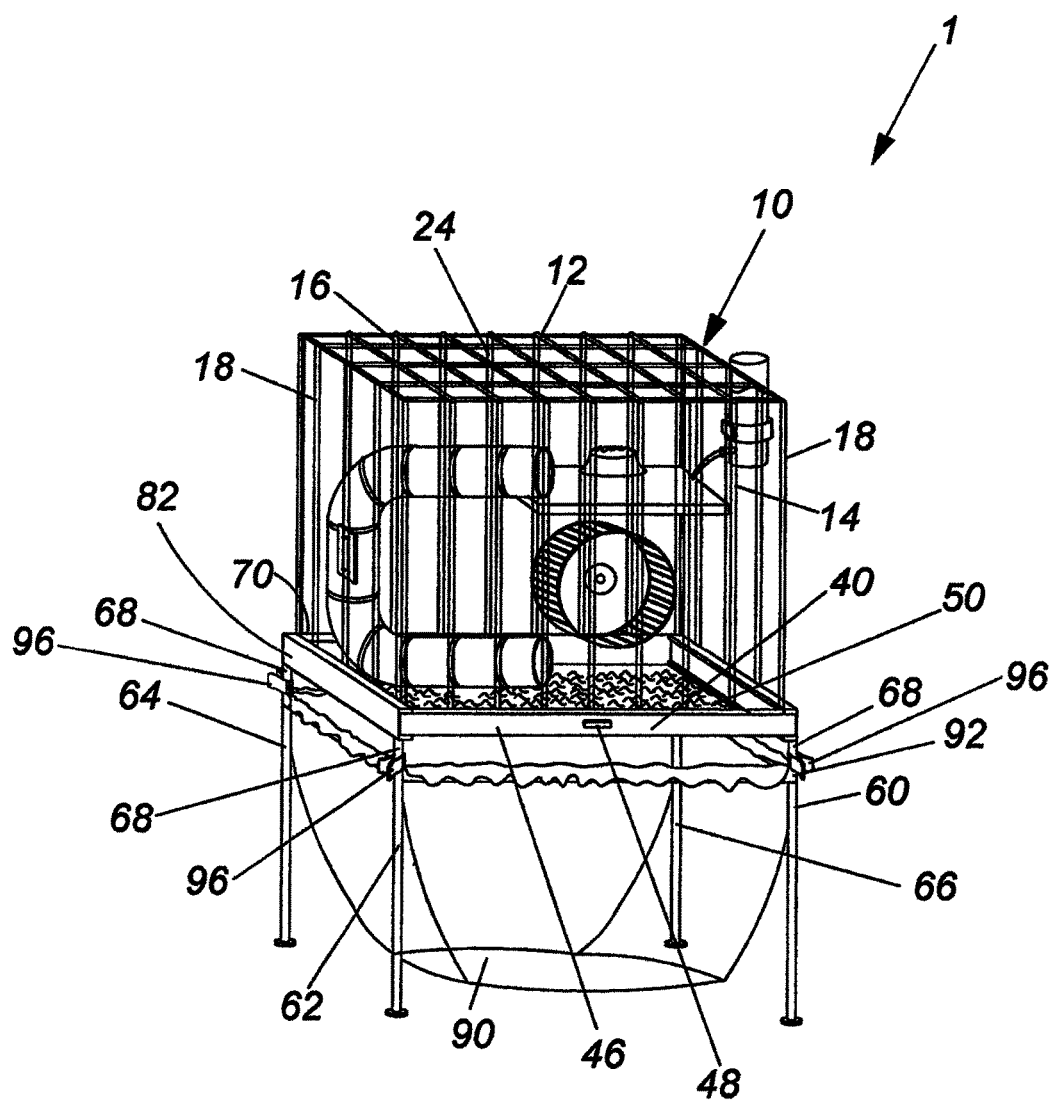
FIG. 1 is a pictorial representation of the instant invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
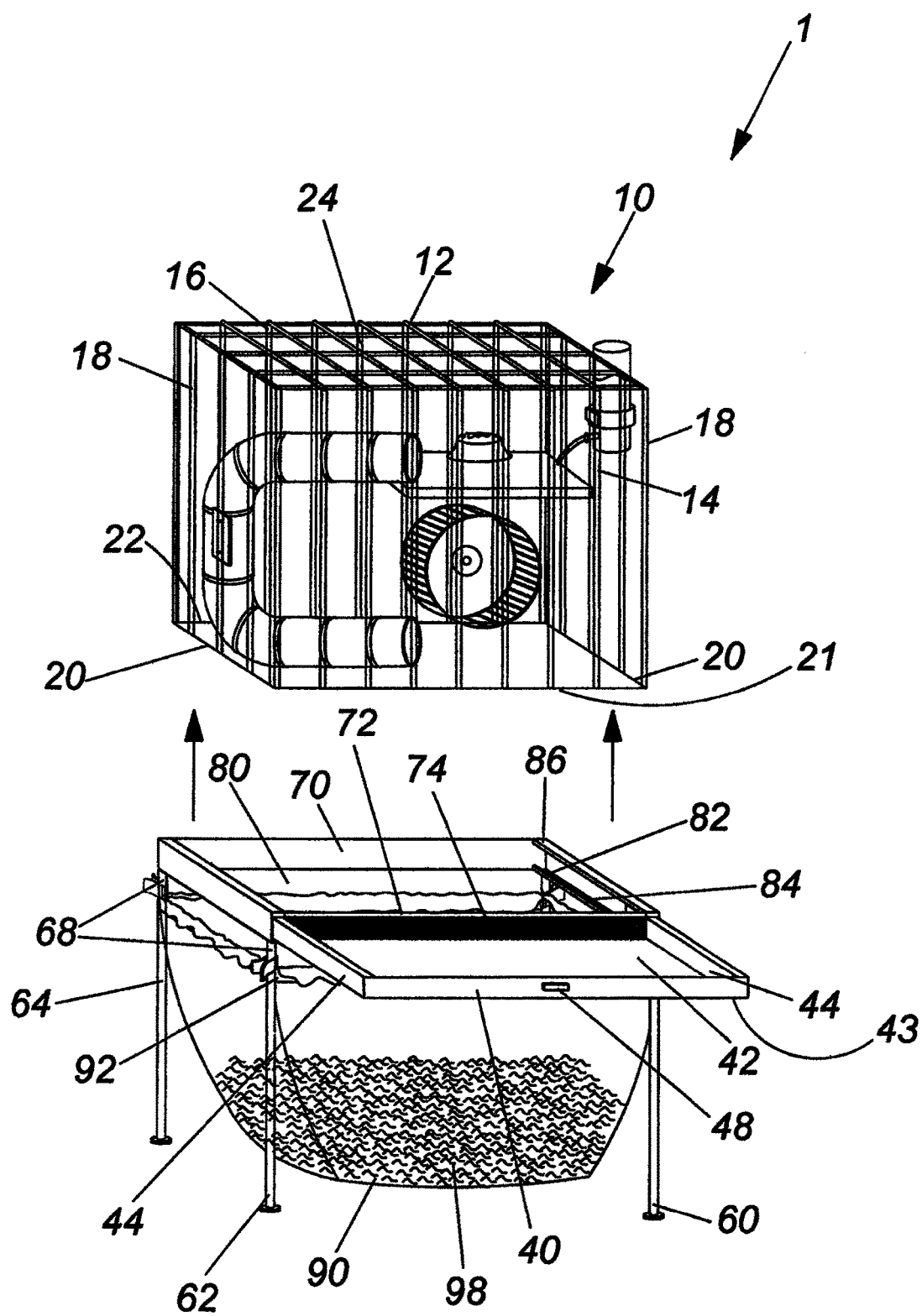
FIG. 2 is a perspective view of the movable bottom in use of the instant invention.
Figure 3:
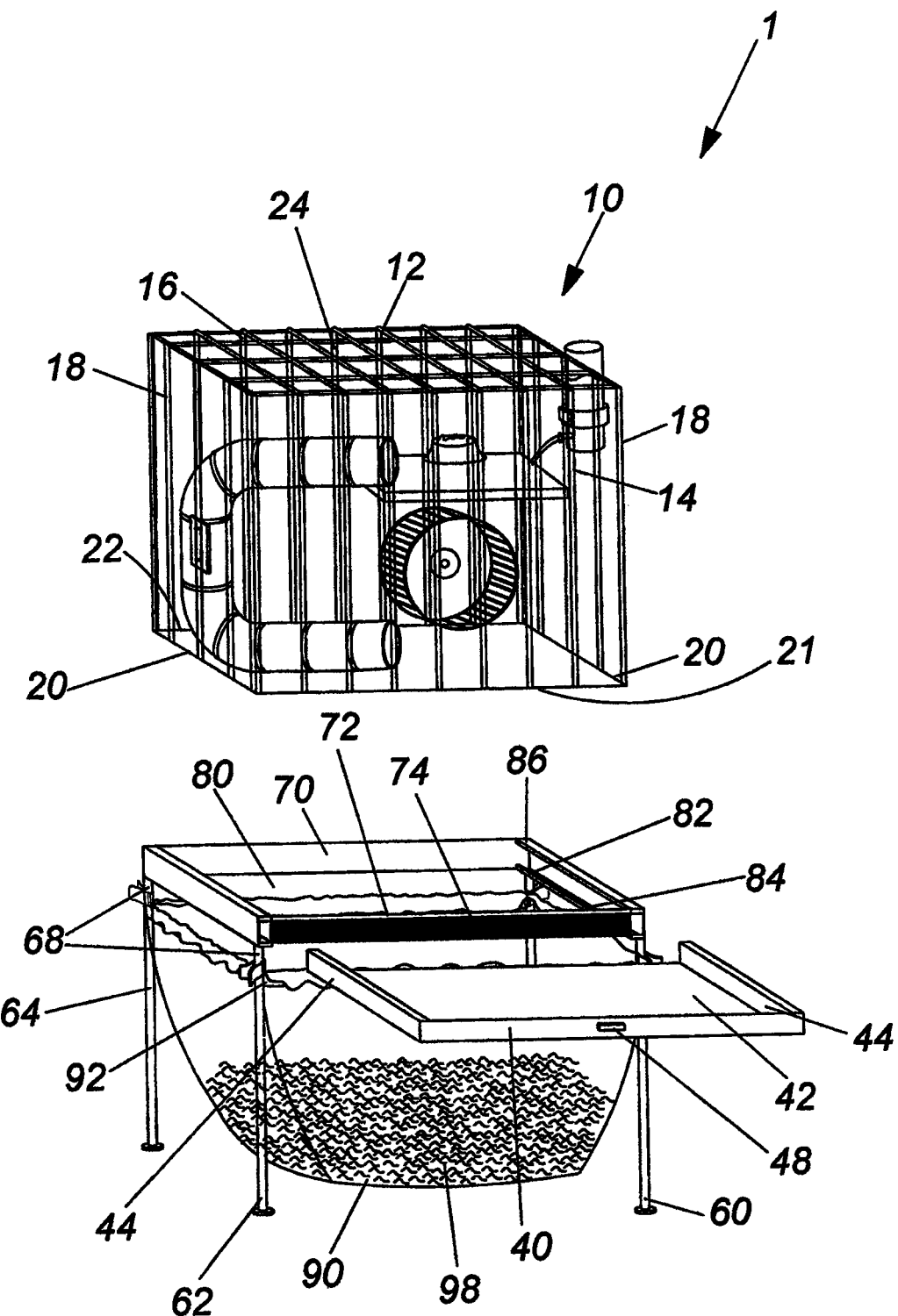
FIG. 3 is perspective view of the movable bottom withdrawn from the instant invention.

As shown in FIGS. 1-3, a waste disposal system rearing cage 1 for animals including a cage body 10, two pair of legs 60,62,64,66, a pullout movable bottom 40, a plurality of scraping elements 74, and a waste disposal container 90 is provided. The cage body 10 is comprised of a top wall 12, front wall 14, back wall 16, and opposing sidewalls 18. The cage body 10 is removably attached along the bottom edge of each sidewall 20, front wall 21, and back wall 22 to the two pairs of legs 60,62,64,66. In the preferred embodiment the cage body 10 is constructed of a rigid wired net meshing 24; however, it is contemplated that the cage body be constructed of plastic or other suitable material for rearing an animal.

At the top end 68 of the two pairs of legs 60,62,64,66 there is a cavity 80 for holding and maintaining the movable bottom 40. The pullout movable bottom 40 is insertable into the cavity 80 to be positioned at the bottom end of the front wall 21, thus providing a bottom wall to the cage body 10. The movable bottom 40 includes a front panel 46, opposing side panels 44, and top surface 42 for placement of bedding 50 and such. Bedding 50 can be spread on the top surface 42 of the movable bottom 40 and easily replaced following waste disposal. Furthermore, the movable bottom 40, in combination with the bedding 50, defines a surface that the small animal comes in contact with that protects its paws and soles of its feet from potential health risks that exist with mesh cage bottoms. The front panel 46 can include a handle 48 on the outside portion for ease in inserting and removing the movable bottom 40.

The cavity 80 is constructed and arranged to hold and maintain the movable bottom 40 within the waste disposal rearing cage system 1. The cavity 80 contains a pair of U-shaped rails 82 attached to opposing legs 60,62,64,66. When the cage body 10 is in use the bottom edge 20 of opposing sidewalls 18 on the cage body 10 is in contact with the top side 86 of the U-shaped rail 82, thereby providing a shelf for the cage body 10 to sit atop of. When the cage body 10 is removed, shown in FIG. 2, the top side 86 of the U-shaped rail 82 is exposed. The bottom side 84 of the U-shaped rail 82 engages the bottom surface 43 of the movable bottom 40 and maintains the movable bottom 40 therein. The bottom side 84 of the U-shaped rail 80 allows for slidable engagement of the movable bottom 40. On the top end 68 between the back pair of opposing legs 64 and 66 is a barrier 70. The barrier 70 acts as a stopper for the movable bottom 40 so that the movable bottom 40 is not pushed in further than the barrier 70. The barrier 70 also provides a back wall enclosure when the movable bottom 40 is within the cavity 80. When the cage body 10 is in use the bottom edge of the back wall 22 on the cage body 10 is in contact with the barrier 70, thereby providing another shelf for the cage body 10 to sit atop of The movable bottom 40 along with the cage body 10, and back barrier 70 defines a space for rearing an animal.

The plurality of scraping elements 74 extend horizontally downward along a cross-member 72 supported by the front pair of legs 60 and 62 and positioned above the cavity 80. The scraping elements 74 are constructed and arranged to maintain contact with a top surface 42 of the movable bottom 40. In a preferred embodiment, the scrapper means 74 include wire bristles; however, other scraper means are contemplated such as plastic bristles, or a plastic ledge having a tapered edge for engagement with the top surface of the movable bottom, or the like.

Figure 4:
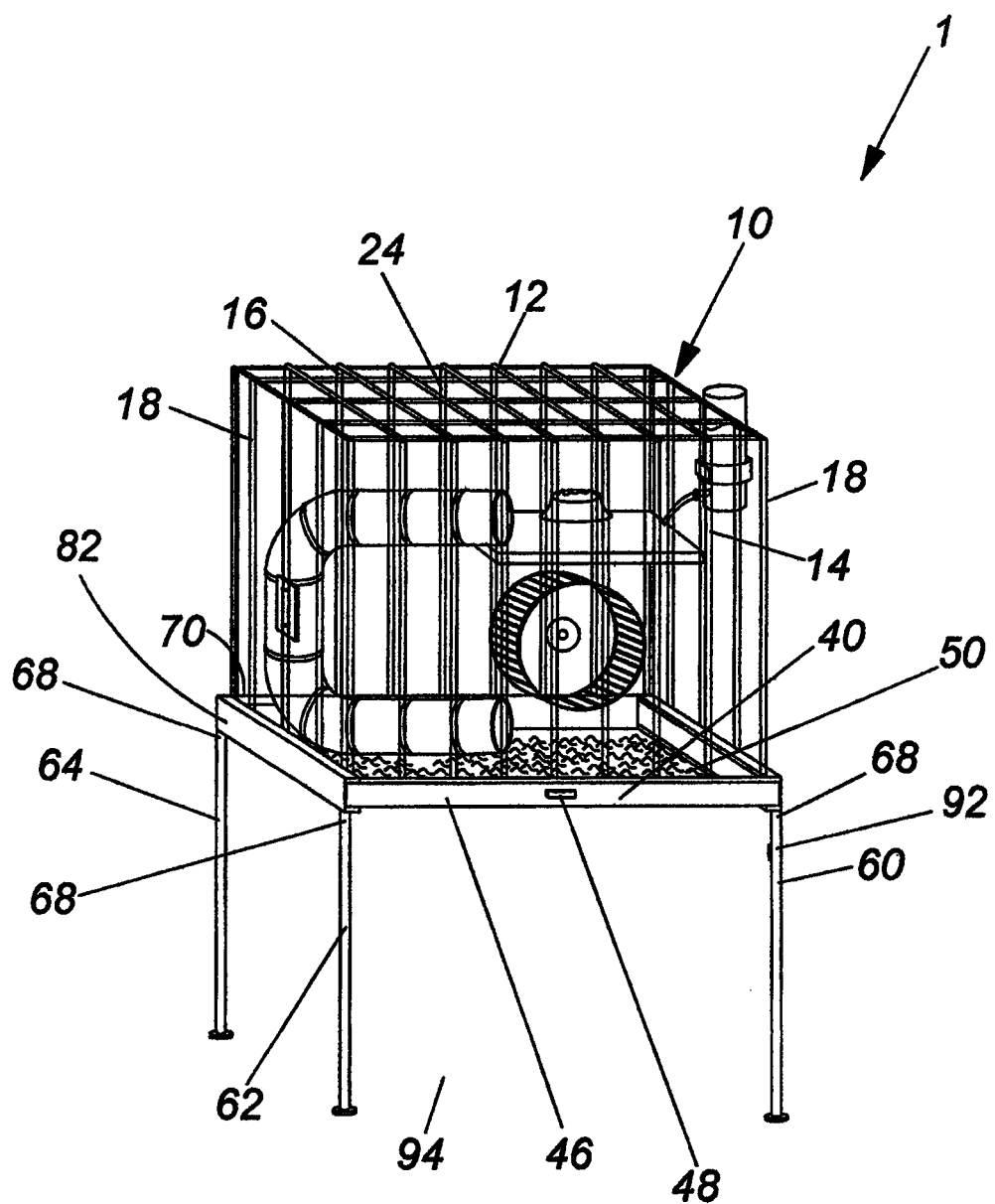
FIG. 4 is a perspective view of an alternative embodiment of the instant invention.

The disposal system is a flexible bag 90 that can be suspended from crossbar 92 between the pair of legs 60,62, 64,66 for receiving waste therein. In the preferred embodiment the bag 90 is of a suitable size to overlap the crossbar 92 on the legs 60,62,64,66 and then held in place using clips 96, tie-wraps, string, or the like. It is also contemplated that the flexible bag 90 can be placed within a container 94 that is appropriately sized to fit between the two pairs of legs 60,62,64,66 and of a suitable height just below the movable bottom 40 as shown in FIG. 4. As the movable bottom 40 is pullout from the cavity 80 the scraping elements 74 "push" waste matter 98 towards the edge of the movable bottom 40 and as the movable bottom 40 is complete withdrawn from the cavity 80, waste matter 98 falls into the container 94.

In operation, the waste disposal system is defined as a cage body having a top wall having a front wall, a back wall, and a first and second sidewall depending therefrom. A base is securable to the cage body to define a cavity for placement of an animal. The base is formed from opposing U-shaped channels spaced apart by a rear wall placed at a distal end of each of the channels and a scraping element placed at the proximal end of each of the channels. A movable bottom is positioned between the channels constructed and arranged to have an upper surface of the shelf wiped clean when the bottom shelf is drawn past the scraping element. The base includes legs extending from a bottom edge to elevate the base a predetermined distance above a surface. A waste disposal container may be positioned between the legs and beneath the movable bottom. The waste disposal container is sized to receive waste matter placed on the moveable bottom when the movable bottom is drawn past said scraping element.

The scraping element is comprised of rigid bristles made of plastic or wire extending over a portion of the moveable bottom. Alternatively, the scraping element is a flexible strip of rubber material or plastic wherein said scraping element operates as a squeegee to remove debris as the movable bottom is drawn past the scraping element. The movable bottom can be made of plastic or metal and may be perforated to allow passage of smaller debris or a non-stick surface to allow for ease of transfer.

Figure 5:
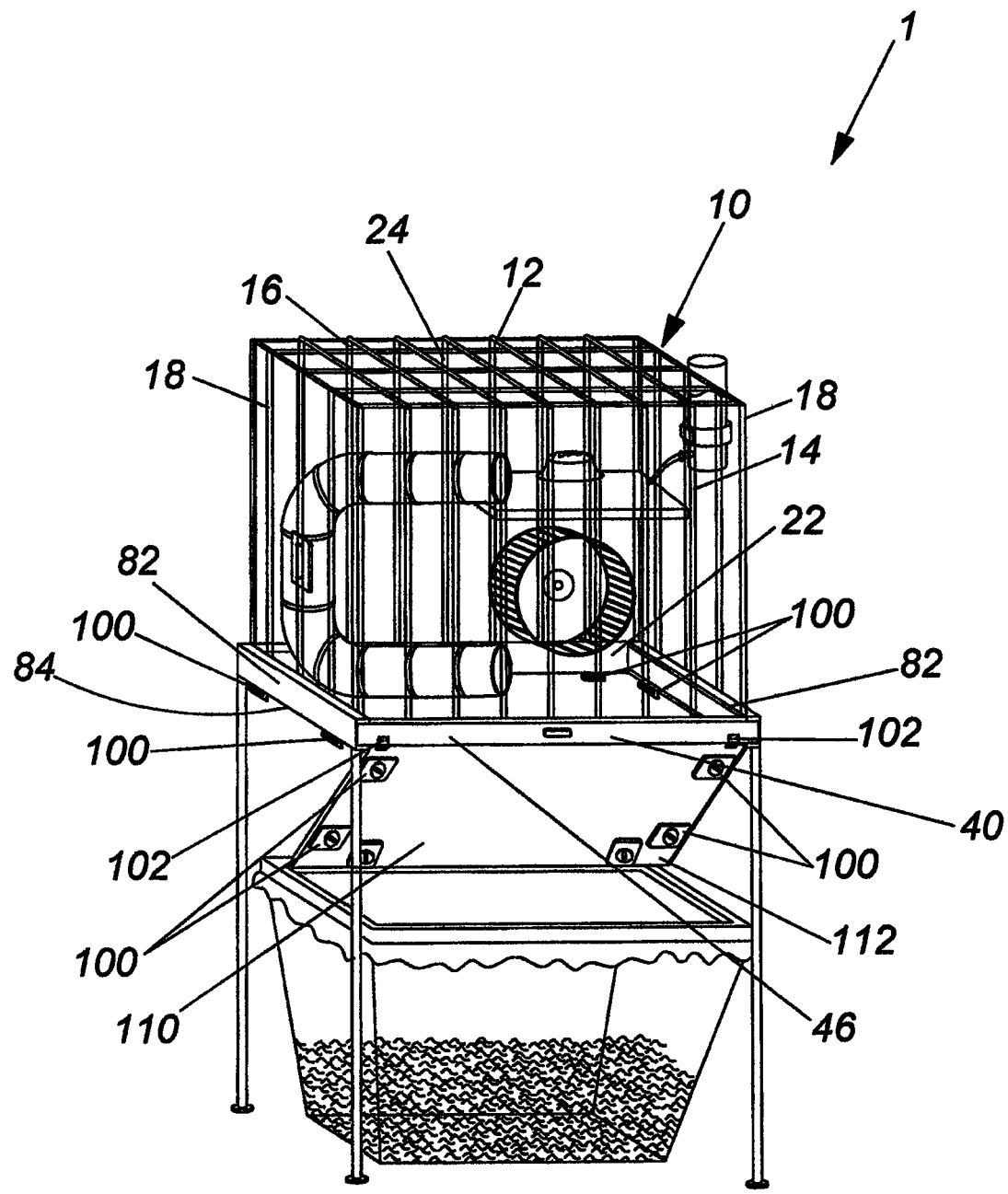
FIG. 5 is perspective view of an alternative embodiment of the instant invention.

As shown, in FIG. 5, it is contemplated that the top surface 42 of the movable bottom 40 is removably affixed thereto. The movable bottom 40, which includes a front panel 46, top surface 42, opposing side panels 44, and tray 110, is insertable into the cavity 80 created by the cage body 10 and U-shaped rails 82. Along the bottom surface 112 of the tray 110 removable fasteners 100 are attached along the edges to engage corresponding removable fasteners 100 on the bottom surface 84 of the U-shaped rails 82. Along one panel, for illustration purposes the front panel 46, is included a pair of hinges 102 that is affixed to the bottom surface 112 of the tray 110. The tray 110 will be unfasten along the opposing side panels 44 and back panel 70 and remain hinged 102 along the front panel 46 thereby allowing waste matter 98 on the tray 110 to be disposed of in the waste bag 90. The tray may further include a rotatable hinge whereby the movable bottom can be rotated allowing the upper surface of the tray to become a lower surface. This will allow the tray to be cleaned and returned to use even if damp, as the damp section can be directed outward the dry section used for the base of the tray. This would allow for disinfection of the tray and reuse without the need for the tray to be completely dry.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A animal habitat cage body defined by a top wall, a front wall, a back wall, and a first and second sidewall coupled to a waste disposal structure, said waste disposal structure comprising:
   a base securable to a lower portion of each said wall of said cage body, said base having a movable shelf that is slidably positioned between two opposing U-shaped channels spaced apart by a rear wall located along a distal end of each U-shaped channel and a frontal wall located along a proximal end of each U-shaped channel, said base held in an elevated position by a plurality of legs secured to a bottom of said base;
   a scraper element secured to said frontal wall of said base constructed and arranged to engage an upper surface of said movable shelf; and
   a flexible bag secured to said base at a position beneath said movable shelf;
   whereby said cage body with said shelf form an enclosure for housing of an animal, said shelf providing a floor to support the animal and collect animal waste;
   wherein animal waste is deposited into the flexible bag by moving said shelf beneath said scraper element.

2. The animal habitat cage according to claim 1, whereby said shelf is sheet of material with a smooth upper surface having a front wall and two opposing side walls, said front wall including a handle for drawing said movable bottom from said base.

3. The animal habitat cage according to claim 2 whereby said scraping element is comprised of rigid bristles extending over a portion of said shelf.

4. The animal habitat cage according to claim 3, whereby said rigid bristles are selected from the group consisting of plastic or wire.

5. The animal habitat cage according to claim 1, whereby said shelf is plastic.

6. The animal habitat cage according to claim 1 wherein said shelf is metal.

7. The animal habitat cage according to claim 1 whereby said scraping element is a substantially flat material extending over a portion of said shelf.

8. The animal habitat cage according to claim 7 whereby said scraping element is a flexible strip of rubber material wherein said scraping element operates as a squeegee to allow removal of waste from said shelf when said shelf is drawn past the scraping element.

* * * * *